June 5, 1923.

W. MANNOWSKI 1,457,666

APPARATUS FOR DISPLAYING ADVERTISEMENTS

Filed March 23, 1922 4 Sheets-Sheet 1

June 5, 1923.  1,457,666
W. MANNOWSKI
APPARATUS FOR DISPLAYING ADVERTISEMENTS
Filed March 23, 1922  4 Sheets-Sheet 2
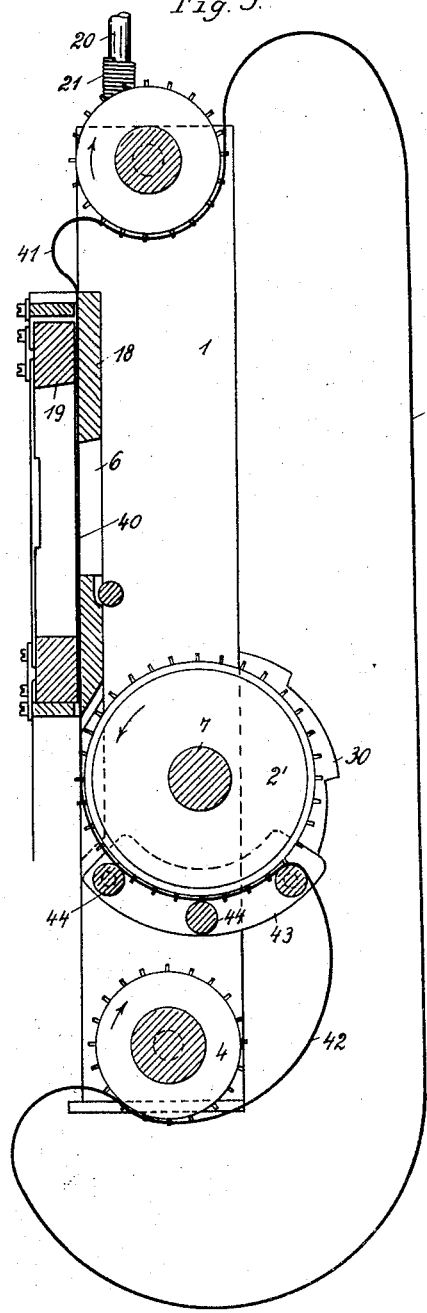
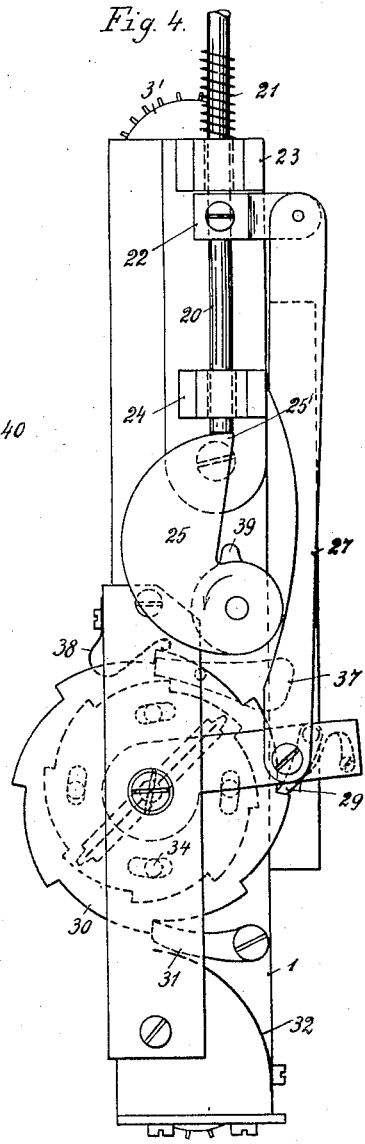

June 5, 1923.

W. MANNOWSKI 1,457,666

APPARATUS FOR DISPLAYING ADVERTISEMENTS

Filed March 23, 1922

June 5, 1923.                                                                              1,457,666
W. MANNOWSKI
APPARATUS FOR DISPLAYING ADVERTISEMENTS
Filed March 23, 1922                    4 Sheets-Sheet 4

Patented June 5, 1923.

1,457,666

UNITED STATES PATENT OFFICE.

WALTER MANNOWSKI, OF BERLIN-NOWAWES, GERMANY, ASSIGNOR TO THE FIRM DITTA "REMA," OF MILAN, ITALY.

APPARATUS FOR DISPLAYING ADVERTISEMENTS.

Application filed March 23, 1922. Serial No. 546,881.

*To all whom it may concern:*

Be it known that I, WALTER MANNOWSKI, a citizen of the German Republic, residing at Berlin-Nowawes, Germany, have invented certain new and useful Improvements in Apparatus for Displaying Advertisements (for which I have filed applications in Germany on the 8th of March, 1921, and on the 26th of September, 1921), of which the following is a specification.

This invention relates to a device for displaying advertisements in which advertising pictures and other advertisements are displayed with the aid of endless bands, specially film bands, so that they appear on the screen considerably enlarged. The device does not serve to display moving pictures but advertisements which change in short intervals (for instance every 4 seconds) but in such a manner that the change takes place quite suddenly. The advertisement is thus displayed for several seconds to be rapidly replaced by another advertisement, this being continued for any desired time.

The effect is surprising in so far as, owing to this very sudden change, it is not apparent how the change is made. This forms a decided difference from the apparatuses in which the advertisements change as well but only slowly so that the eye of the spectator notices the change.

The novel device permits the most various applications. It is of small size so that it can for instance be mounted in a vehicle the rear wall of which consists of a transparent screen upon which, with the aid of a source of light and an object glass the film pictures are projected in being enlarged. The drive can be effected, with the aid of chain-rope or toothed wheel transmission, from a moving part for instance the axle of the vehicle.

The device could further be mounted in shop windows or in show rooms, in which case an electro-motor or drive is perfectly used.

In order that the invention may be clearly understood, I shall proceed to describe the same with reference to the form of construction shown, by way of example, on the accompanying drawing, wherein:—

Fig. 3 is a section on line A—B of Fig. 2 viewed from the right.

Fig. 4 is a side elevation of Fig. 2 seen from the left.

Figure 1:
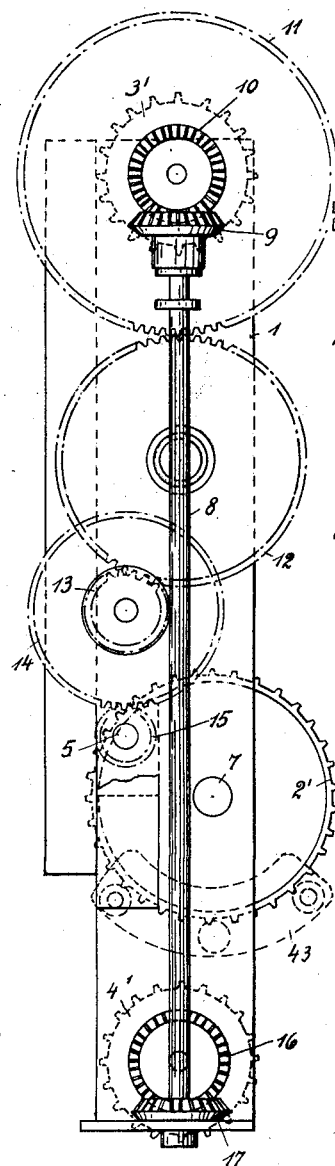
Fig. 1 is a side elevation of the elevation of Fig. 2 viewed from the right.
Figure 2:
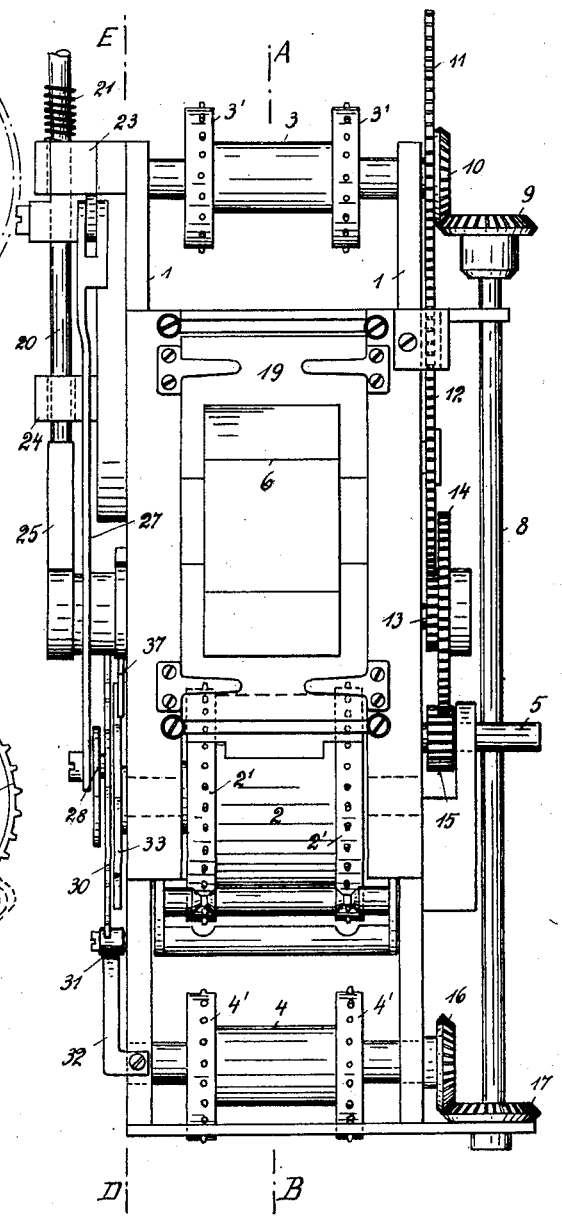
Fig. 2 is a elevation.

40 is a film band with pictures which need not have any relation to one another and which can represent different advertisements. This film band is moved, in the well known manner, behind a window 6 by means of the guides 18, 19, a source of light and an object glass being arranged as usual behind and in front of the window. The source of light and the object glass are not shown on the drawing. The guides 18, 19 and the mechanism for producing the movement of the film band are mounted on frames 1, 1.

For the intermittent and sudden movement of the endless film band a main drum 2 with teeth 2' mounted upon a shaft 7 and two rollers 3, 4 having teeth 3', 4' are provided. The teeth of the drum and of the rollers engage with the perforations provided along the edges of the film band. The main drum 2 has at its lower end an oscillating lever 43 with guide pulleys 44 designed to hold the film band upon the drum. 41 and 42 are loops formed by the film band which are necessary as the drum 2 is revolved only intermittently whilst the rollers 3 and 4 are revolved continuously as will be hereinafter described. Upon a shaft 5 a belt pulley or a toothed wheel is mounted. This shaft is driven uniformly from a constantly working drive, for instance an electro-motor or from any of the moving parts of the vehicle.

Through the intermediary of toothed wheels 15, 14, 13, 12, 11 the movement is transmitted at a slow transmission to the roller 3 so that the roller revolves slowly in the direction of the arrow (Fig. 3) and pushes the film band at 41 in front of the window. The further toothed wheel transmission by the bevel wheels 10, 9 the shaft 8 and bevel wheels 17, 16 serves to ensure that the film band, fed by drum 2 is pulled off said drum at the same speed at which the roller 3 moves.

The drum 2 serves for bringing suddenly another picture in front of the window if a picture has stood for instance four seconds before the window. This is effected in the following manner:

A cam 25 is keyed upon the continuous axle of the toothed wheel 13 at the left hand side of the frame, said cam merging gradually into the highest point 25'. The end of a rod 20 guided in brackets 23, 24 is pressed by the action of a spiral spring 21 against this cam 25. Upon this rod 20, an arm 22 is fixed, to the free end of which a rod 27 is hinged which is designed to operate an oscillating lever 28 whose fulcrum is situated in the axle of shaft 7 of drum 2. This lever 28 carries a spring controlled pawl 29 which engages with a ratchet wheel 30 keyed upon the shaft of the drum.

The operation is as follows:—

Figure 5:
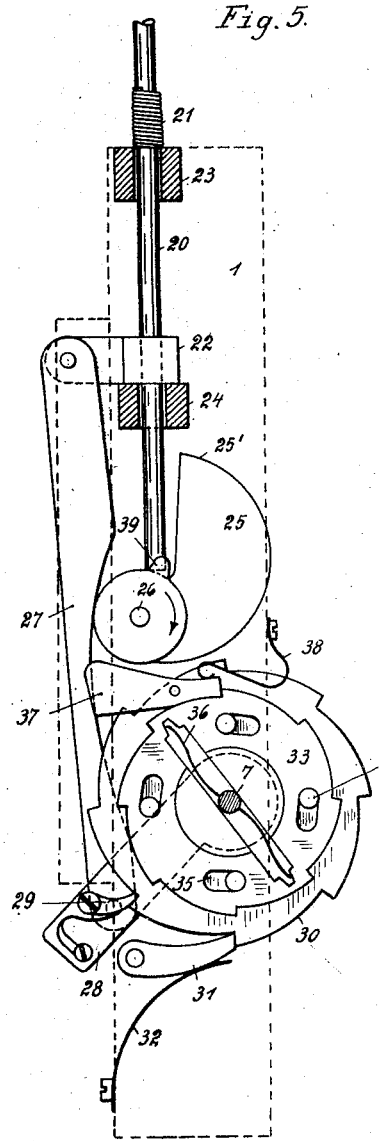
Fig. 5 is a section on line C—D of Fig. 2 seen from the right and showing the drive.
Figure 6:
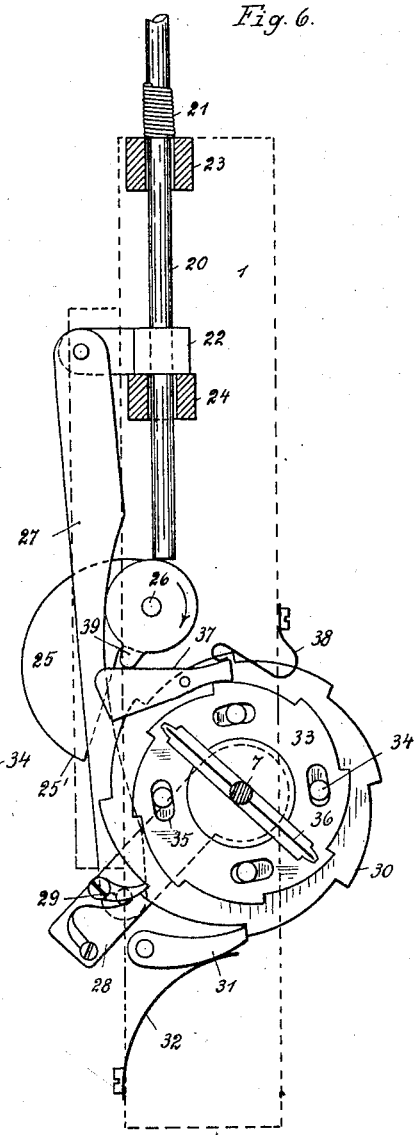
Fig. 6 is a similar section as Fig. 5 showing the parts of the drive in another position.

If the cam 25 revolves in the direction indicated by the arrows, Figs. 4, 5 and 6, the rod 20 is gradually lifted to the position shown on Fig. 4 and the spring 21 is put under tension. As soon as the highest point 25' of the cam moves from the position Fig. 4 to the position Fig. 5 the rod 20 is suddenly brought by the action of spring 21 from the position shown on Fig. 4 to the position shown on Fig. 5 and the connecting rod 27 operates the lever 28 so that pawl 29 revolves the ratchet wheel 30 for one tooth, this movement corresponding exactly with the length of one picture upon the film band 40.

During all this time and during all the time shaft 5 is revolving, the roller 3 supplies at 41 the required length of film and roller 4 pulls off the loop 42 the film material in excess.

In order to ensure the proper working, the drum 2 being revolved very suddenly, two measures are necessary to bring the new picture directly to the exact position, viz:

1. The drum 2 must not be able to turn back, for instance by the jamming of the pawl 29 which is returning to its initial position, and 2. The drum 2 must not be able to revolve beyond the determined amount.

The first measure is carried out with the aid of a counter pawl 31 of known type which is pushed forward by the action of a spring 32 and the second measure is carried out with the aid of a mechanism which will be more fully described now. Upon shaft 7 a ratchet wheel 33 is revolubly mounted whose teeth are directed in opposite direction as the teeth of ratchet wheel 30. This second ratchet wheel 33 has slits 35 (one would be sufficient) with which studs 34 engage which are fixed in the ratchet wheel 30. A spring 36 fixed upon shaft 7 is located in a slit of the ratchet wheel 33 so that at a determined position of this ratchet wheel 33 (Fig. 5) the spring will expand and the ends of slits 35 are pressed against the studs 34. This occurs if a pawl 37 controlled by a spring 38 engages with a space between two teeth of the ratchet wheel 33. If the pawl is however in contact with a tooth of said ratchet wheel (Fig. 6) the spring 36 is stretched and there is play between the ends of slits 35 and the studs 34.

When the highest point 25' of cam 25 is moving from the position Fig. 4 to the position Fig. 5 the pawl 37 stops the ratchet wheel 33 wherefrom results that during the sudden revolution of drum 2 this drum can move only for a distance which corresponds with the play which existed at the position Fig. 4 between the studs 34 and the ends of slits 35 when the pawl 37 was lifted out of engagement with ratchet wheel 33. Upon the shaft 26 of cam 25 there is further mounted a smaller cam disk 39 which is designed to lift the pawl 37 against the action of spring 38 when the cam disk moves from the position Fig. 6 to the position Fig. 5. The spring 36 can thus revolve slightly the ratchet wheel 33 from the position Fig. 5 to the position Fig. 6 so that the right hand side end of pawl 37 rests upon the next following tooth of the ratchet wheel 33 as shown on Fig. 6. If the rod 20 drops again so that the ratchet wheel 30 is revolved for the length of one tooth, this revolving movement is positively braked as the next following tooth of the ratchet wheel 33 is stopped by the pawl 37. The ratchet wheel 33 stops therefore the movement exactly in accordance with the length of its teeth, the revolving movement of said ratchet wheel 33 being composed of two parts, of which one depends on the tension of spring 36, as the slits 35 are displaced with regard to the studs 34, the other part movement depending on the revolution of ratchet wheel 30, whereby at the same time the short interval between the slits 35 and the studs 34 being recovered which had been caused by the action of spring 36.

This separation into two part-movements is necessary in order to ensure the inactive position of pawl 37 notwithstanding the pressure of spring 38 after the small cam 39, at the movement of the large cam 25, has released this pawl 37.

In this manner the sudden and rapid advance of the several pictures of the film band is successively ensured, the intervals between the intermittent movements being regulated by the convenient selection of the ratio of transmission.

The device can be evidently mounted in a casing and the film band 40 can be guided in a convenient manner.

Figure 7:
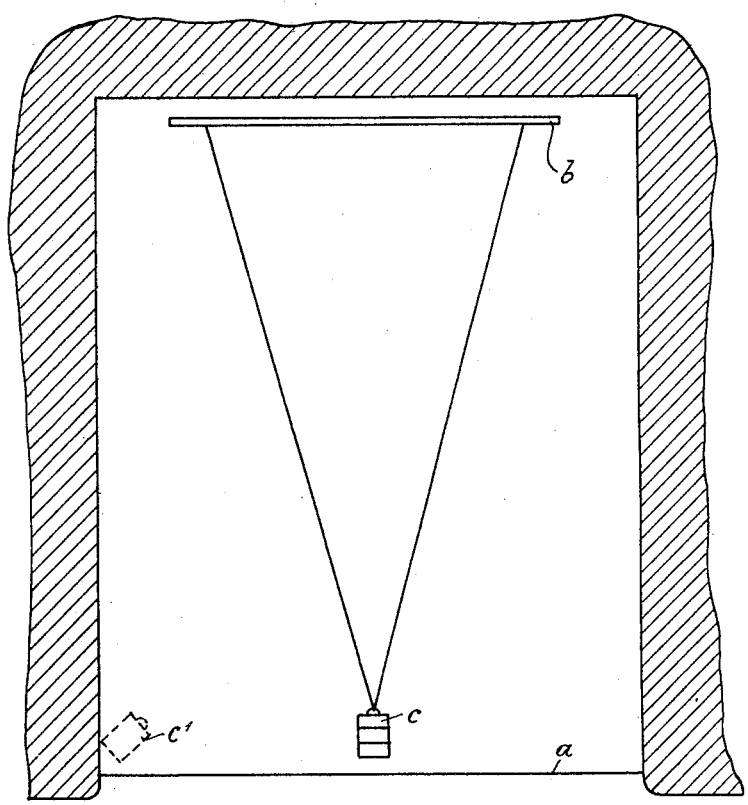
Fig. 7 shows how the apparatus is used for displaying advertisements in shop-windows.

Fig. 7 shows how the apparatus is used for displaying advertisements in shop windows.

$a$ is the window pane of the shop window, $b$ is the screen upon which the advertisements are to be projected and $c$ is the projecting apparatus which is constructed as shown on Figs. 1–6 and as described above.

Instead of mounting the apparatus $c$ behind the window pane $a$ it could be arranged in a corner of the shop window ($c'$ of Fig. 7) or at the top of the window. If the screen $b$ is of transparent material it could be placed directly behind the window pane $a$ the apparatus $c$ being in this case mounted behind the screen in the background of the shop window.

I claim:—

1. An improved apparatus for displaying advertisements on endless bands, specially film bands, comprising in combination a drum for bringing the film before the projection window, a source of power, a transmission gear and means for driving said drum in such a manner that the drum stops for a determined (short) time when the advertisement to be displayed stands behind the window whereupon said drum is suddenly and rapidly revolved for a distance corresponding to the length of one picture upon the film band, said driving means consisting of a ratchet wheel on said drum, a cam keyed upon the shaft of said transmission gear, a spring controlled rod mounted upon said cam, a connecting rod hingedly connected at its upper end with said rod, a lever hingedly connected with the lower end of said connecting rod, a spring influenced pawl pivotally mounted upon said lever engaging with said ratchet wheel so that, if said rod drops suddenly from the highest point of said cam the pawl is operated and makes the drum suddenly revolve for the length of one tooth of said ratchet wheel.

2. An improved apparatus for displaying advertisements on endless bands, specially film bands, comprising in combination a drum for bringing the film before the projection window, a source of power, a transmission gear and means for driving said drum in such a manner that the drum stops for a determined (short) time when the advertisement to be displayed stands behind the window whereupon said drum is suddenly and rapidly revolved for a distance corresponding to the length of one picture upon the film band, said driving means consisting of a ratchet wheel on said drum, a cam keyed upon the shaft of said transmission gear, a spring controlled rod mounted upon said cam, a connecting rod hingedly connected at its upper end with said rod, a lever hingedly connected with the lower end of said connecting rod, a spring influenced pawl pivotally mounted upon said lever engaging with said ratchet wheel so that, if said rod drops suddenly from the highest point of said cam the pawl is operated and makes the drum suddenly revolve for the length of one tooth of said ratchet wheel, a second ratchet wheel revolubly mounted upon the shaft of said drum having a diametrically arranged slit and a circular slit, the teeth of said second ratchet wheel being directed in opposite direction as the teeth of the first ratchet wheel, a stud of the first ratchet wheel engaging with the circular slit of the second ratchet wheel, a blade spring located in the diametrical slot of said second ratchet wheel designed to revolve said second ratchet wheel for a distance corresponding with the play between said stud and the end of the slit, a pawl for this second ratchet wheel, a second cam revolving with the first mentioned cam for intermittently lifting the second mentioned pawl out of the second ratchet wheel, said second mentioned pawl being maintained in this lifted position for a determined time even if the cam does no longer act upon the same in consequence of the action of said stud and slit connection so that the first ratchet wheel and with the same the drum be prevented to execute an excessive revolving movement.

In testimony whereof I affix my signature in presence of two witnesses.

WALTER MANNOWSKI.

Witnesses:
 W. MUTH,
 CURT MÜLLER.